United States Patent Office 2,697,530
Patented Dec. 21, 1954

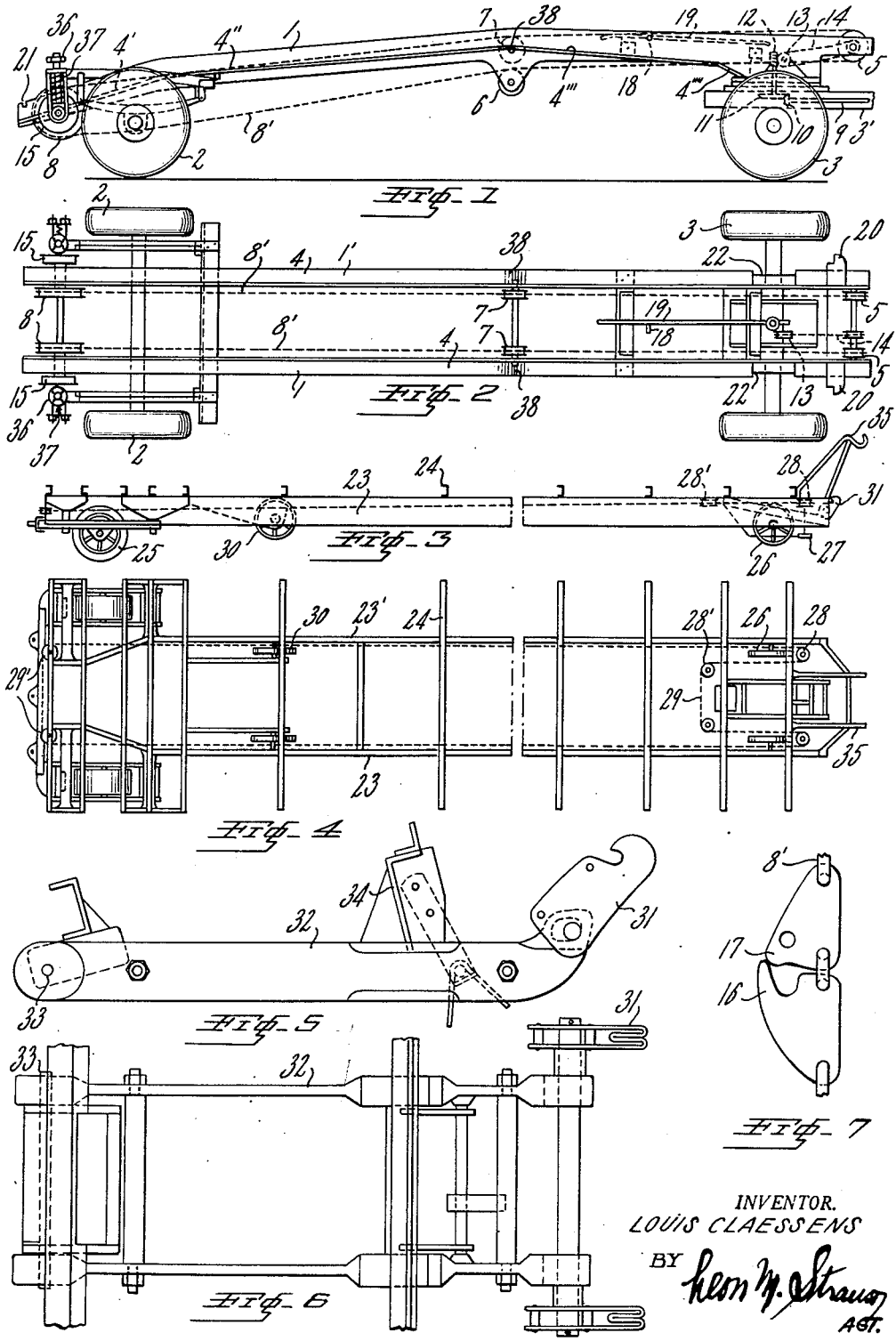

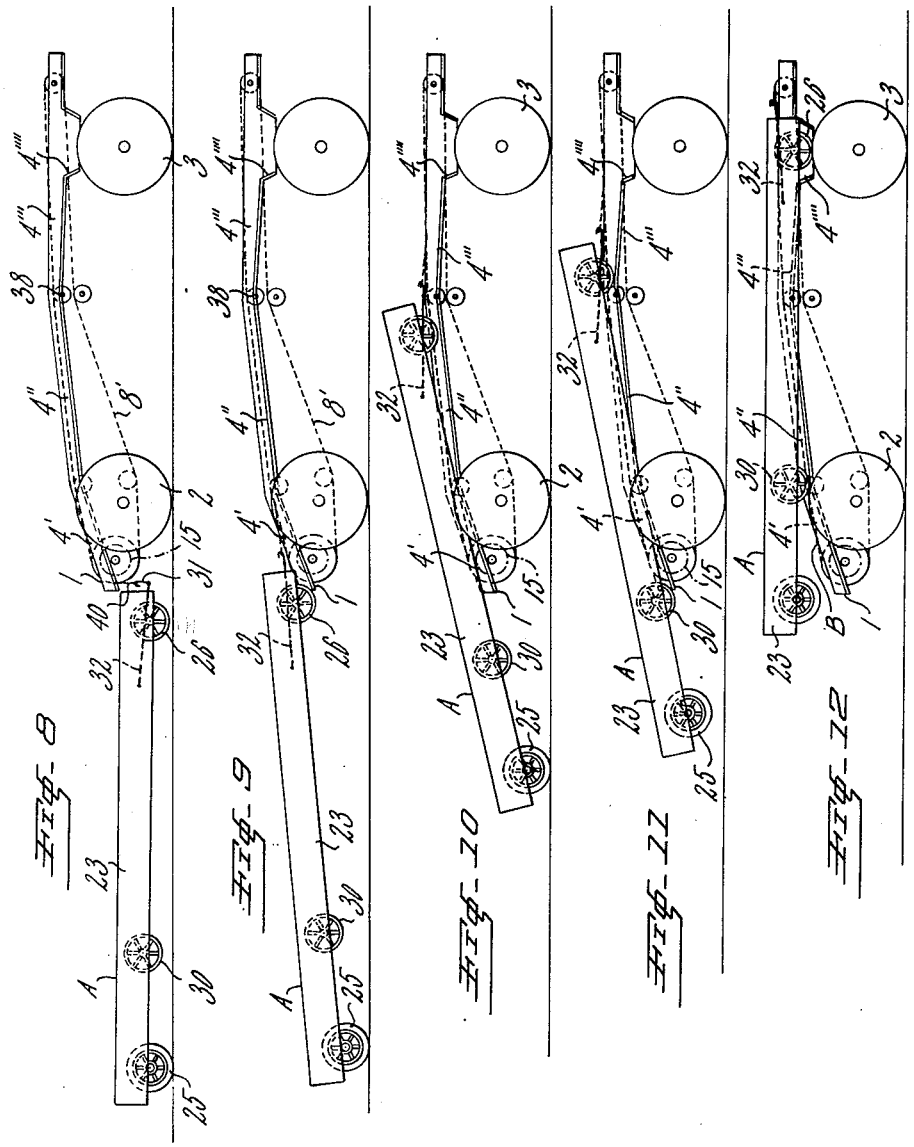

2,697,530

ARRANGEMENT FOR THE AUTOMATIC LOADING AND UNLOADING OF TRANSPORTATION VEHICLES

Louis Claessens, Kontich, Belgium

Application February 3, 1949, Serial No. 74,428

Claims priority, application Belgium February 19, 1948

3 Claims. (Cl. 214—516)

This invention relates to a novel arrangement for loading and unloading goods by means of a plurality of carriers, one of said carriers comprising a loading frame which is adapted to receive a load and another transporting carrier being further adapted to receive said loading frame with or without its load.

Loading arrangements of this general type have heretofore been known but have suffered from certain inherent deficiencies and difficulties in operation, including the tendency of the load to shift, difficulty in loading, the necessity for skill and strength to operate the arrangement, and the like.

It is an object of the present invention to provide a loading arrangement which avoids these disadvantages.

More particularly, it is an object of this invention to provide means facilitating retaining of the loading frame in substantially horizontal position during transit on said transportation carrier.

Another object of the invention is to provide means affording the transfer of the loading frame from a surface, such as the ground, to said transporting carrier in a very efficient, safe and speedy manner.

A further object of the invention is to provide an arrangement in which the loading frame is guided onto said transporting carrier and is stabilized against accidental displacement in all directions with respect to said transporting carrier.

Another object of the invention is to provide an arrangement as indicated, wherein the loading frame can be moved about a surface such as the ground to facilitate loading.

Another object of the invention is to provide an arrangement as indicated wherein the loading frame may be of considerable length to facilitate transport of heavy loads.

Yet another object of the invention is to provide an arrangement as indicated, which is inexpensive to manufacture and operate.

Another object of the invention is to provide an arrangement, wherein coupling and uncoupling of the two carriers can be effected without particular skill or strength.

Other objects of the invention will become apparent from the detailed description hereinafter set forth and by reference to the accompanying drawings, in which:

Figs. 1 and 2 are, respectively, a side view and a plan view of said transporting carrier;

Figs. 3 and 4 are, respectively, a side view and a plan view of said loading frame;

Figs. 5 and 6 are, respectively, a side view and a plan view on an enlarged scale of the hooking means shown at the right side of Figs. 3 and 4;

Fig. 7 is a side view of two special chain links of an endless chain mounted on the transporting carrier;

Figs. 8, 9, 10, 11 and 12 are schematic side views showing the successive positions of the loading frame and the transporting carrier, relative to each other, in bringing the former to rest on the latter.

The transporting carrier (Figs. 1 and 2) comprises a chassis constituted by two longitudinal beams 1, 1' supported at one end by trailer wheels 2, and at the other end by wheels 3 connected to a power-driven cab, shown in part at 3'. Each of the longitudinal beams 1, 1' extends substantially vertically, and a laterally projecting rib 4 is rigidly connected to the beam along its length on the side remote from the companion beam. The longitudinal beams are shaped so that projecting ribs 4 are subdivided into four sections 4', 4'', 4''', 4'''', angularly disposed with respect to each other and providing a hump 38 approximately at the middle of the longitudinal beams 1, 1'. Pairs of sprocket wheels 5, 6, 7, and 8 are carried by longitudinal beams 1, 1' therebetween. A pair of endless chains 8' runs between sprocket wheels 5 and 8 and above sprocket wheels 6 and 7. A spindle 9 extends from the engine of the tractor (not shown) for driving the endless chains. This is effected through bevel gears 10, 11 mounted, respectively, on spindle 9 and worm 12. Worm 12 cooperates with worm wheel 13 which actuates sprocket wheel 5 through the intermediary of chain 14.

Two special links 16, 17 (Fig. 7) are included in endless chain 8' for linking with the loading frame. Flanged guiding rollers 15 for guiding the loading frame are mounted coaxially with sprocket wheels 8 and are positioned adjacent longitudinal beams 1, 1'.

Centrally of the front part of the trailer, a guiding rod 19, bearing a laterally projecting hook 18, is mounted. Stopping and locking members 20 are provided for cooperation with the loading frame. Elongated ports or recesses 22 are provided in projecting ribs 4 beyond inclined section 4'''' for cooperation with the front wheels of the loading frame. At the rear of beams 1, 1' grooves 21 are cut in the upper edge for coupling thereto a removable guiding rod (not shown) provided with projections for guidance in lateral direction of auxiliary chain strands 40, during cooperation with hooks 35. Wheels 36 are mounted outside of longitudinal beams 1, 1' for rotation in a horizontal plane and are urged towards each other by springs 37.

The loading frame (Figs. 3 and 4) comprises two longitudinally extending U-shaped channel members 23, 23' connected by a plurality of U-shaped cross-bars 24. The loading frame is supported in substantially horizontal position on the ground by rear wheels 25 and front wheels 26. Wheels 26 are spaced from each other at a distance slightly greater than the distance between longitudinal beams 1, 1'. Guiding rollers 27 are similarly spaced from each other and are mounted on a common axis with chain wheels 28.

An endless chain 29 engages wheels 28, wheels 28', and wheels 29' for automatic steering of the loading frame. Supplementary wheels 30 are mounted to the rear of wheels 26 near wheels 25, and are spaced from each other the same distance as wheels 26.

On the front part of the loading frame or carrier, a frame member 32 is pivotally mounted by spindle 33 and is guided by transverse plate 34 which is adapted to cooperate with hook 18 of rod 19 to bring about oscillation of the frame member 32 about the spindle 33. Consequently, the frame member 32 will follow endless chain 8' independently of the positions of the frame in accordance with its displacement along beams 1, 1'. At the front end of frame member 32 two hooks 31 are pivotally mounted for pulling the frame member and the loading frame. Double hook 35 constitutes an auxiliary element for aligning the loading frame with respect to the transporting carrier before its loading, by cooperation with chain strands 40 and hooks 17, by which operation the rear part of the transporting carrier is lifted from the ground, by rotation in backward direction of the endless chains 8'.

If it is desired to transfer the loading frame, laden with goods (not shown) from the ground onto the transporting carrier, the sequence of events can be determined from Figs. 8 to 12. First, hooks 31 of the loading frame are connected to the endless chains 8' by auxiliary chain strands 40 or by any other conventional type of connection and the endless chains 8' are actuated thereby drawing the loading frame toward the transporting carrier as in Fig. 8. Continued rotation of the endless chain lifts the front end of the loading frame off the ground until front wheels 26 contact inclined portion 4' of longitudinal beams 1, 1' (Fig. 9).

As the front wheels 26 of the loading frame advance along lateral projecting ribs 4 to engage inclined portions 4'' (Fig. 10), channel members 23, 23' of the loading frame roll over and are guided by flanged guiding rollers 15. At the same time guiding rollers 27 of the loading frame contact longitudinal beams 1, 1'. Concurrently, wheels 36 are urged against channel members 23, 23′ by springs 37.

The loading frame is further advanced until the rear wheels 25 leave the ground and supplementary wheels 30 reach inclined portions 4′. At this point front wheels 26 are in contact with inclined portion 4‴ (Fig. 11).

As the endless chains 8′ continue to rotate, the loading frame is pulled until front wheels 26 move down incline dportion 4″″ and rest adjacent recesses 22 (Fig. 12). At this point, supplementary wheels 30 have advanced up inclined portion 4′ so that the hump of the longitudinal beams is intermediate wheels 26 and wheels 30 of the loading frame with the loading frame in substantially horizontal position. Stopping and locking members 20 cooperate with the forward end of the loading frame to limit its forward movement by the endless chains 8′.

Because the wheels of the loading frame are positioned on either side of the hump of the transporting carrier, the loading frame will be stabilized against accidental displacements in a forward or rearward direction.

Similarly, the cooperation between the wheels 26 and 30 of the loading frame and vertically extending longitudinal beams 1, 1′ stabilizes the loading frame against accidental lateral displacements.

By incorporating special links 16 and 17 in endless chains 8′, hooks 31 will automatically be coupled thereto as the links open upon turning about sprocket wheels 8. An automatic uncoupling will be effected when the special links again open upon reaching sprocket wheels 5. In this arrangement, the auxiliary chain 40 is employed only for initiating movement of the loading frame.

By reversing the direction of rotation of endless chains 8′ the loading frame may be removed from the transporting carrier.

Accordingly there has been described an arrangement for loading and unloading goods by means of two carriers comprising a plurality of longitudinal supporting means 1, 1′ mounted on one of said carriers, said supporting means including laterally spaced profiled portions 4 angularly disposed with respect to each other and extending continuously from the rearward end 2 of said one carrier to the forward end 3 thereof and providing a hump approximately at the middle of said supporting means 4′, 4″, 4‴, 4″″, chain means 8′ running and guided between said rearward end and said forward end of said one carrier, the other carrier forming a loading frame having a front end and a rear end and provided with two pairs of spaced wheels.

The first pair of spaced wheels 26 is adjacent said front end and the second pair of spaced wheels 30 is positioned adjacent said rear end of said loading frame, the lateral distance of the wheels of each of said pairs corresponding to the lateral spacing of said profiled portions of said one carrier, whereby said wheels of said loading frame may be moved along said profiled portions.

The arrangement further includes hook means 31 on said loading frame connectable with said chain means on said one carrier, whereby said loading frame may be coupled to said one carrier and moved on its wheels along said profiled portions in successive engagement with said angularly disposed supporting means until the wheels of said loading frame are positioned thereon with said hump intermediate said pairs of wheels, said angularly disposed supporting means being so arranged relative to said loading frame when placed thereon that said loading frame assumes a substantially horizontal position on said one carrier, said hump being adapted to retain said frame against displacement in said horizontal position.

It should be understood that the embodiment shown and described has been given solely by way of illustration and not as a limitation upon the scope of the invention, which, on the contrary, is capable of various modifications of the form, character, arrangement and assembly of its elements without exceeding its compass.

Having thus described the invention, what is claimed as new and desired to be secured by Letters Patent, is:

1. An arrangement for loading and unloading goods by means of two carriers; comprising a plurality of longitudinal supporting means mounted on one of said carriers, said supporting means including laterally spaced profiled portions angularly disposed with respect to each other and extending continuously from the rearward end of said one carrier to the forward end thereof and providing a hump approximately at the middle of said supporting means, chain means running and guided between said rearward end and said forward end of said one carrier, the other carrier forming a loading frame having a front end and a rear end and provided with a first pair of spaced wheels adjacent said front end and with a second pair of spaced wheels positioned adjacent said rear end of said loading frame, the lateral distance between the wheels of each of said pairs corresponding to the lateral spacing of said profiled portions of said one carrier, whereby said wheels of said loading frame may be moved along said profiled portions, and hook means on said loading frame connectable with said chain means on said one carrier, whereby said loading frame may be coupled to said one carrier and moved on its wheels along said profiled portions in successive engagement with said angularly disposed supporting means until the wheels of said loading frame are positioned thereon with said hump intermediate said pairs of wheels, said angularly disposed supporting means being so arranged relative to said loading frame when placed thereon that said loading frame assumes a substantially horizontal position on said one carrier, said hump being adapted to retain said frame against displacement in said horizontal position.

2. An arrangement according to claim 1, wherein said loading frame includes a third pair of wheels positioned rearwardly of said second pair of wheels, whereby when said loading frame is disengaged from said one carrier, said frame is supported in a substantially horizontal position by said first pair of wheels and said third pair of wheels, while said second pair of wheels are at a level higher than that of said first and third pairs of wheels.

3. An arrangement according to claim 1, including roller means mounted on said one carrier and positioned adjacent the most rearward profiled portion of said one carrier, said roller means forming auxiliary supporting means on said one carrier for engagement with said loading frame, when said first pair of wheels of said loading frame moves along said profiled portions, until said second pair of wheels of said loading frame engages said profiled portions.

References Cited in the file of this patent

UNITED STATES PATENTS

| Number | Name | Date |
| --- | --- | --- |
| 1,252,899 | Greer et al. | Jan. 8, 1918 |
| 1,288,462 | Alborn | Dec. 24, 1918 |
| 1,562,364 | Reasoner | Nov. 17, 1925 |
| 1,713,271 | Eason | May 14, 1929 |
| 2,021,952 | Wren | Nov. 26, 1935 |